Aug. 4, 1942.  A. R. THOMPSON  2,291,930
STOCK FEEDER
Original Filed April 9, 1940   2 Sheets-Sheet 2
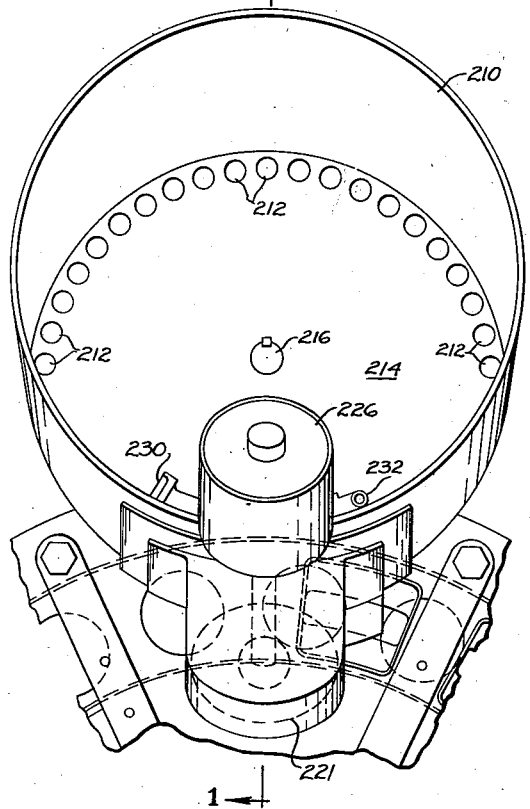
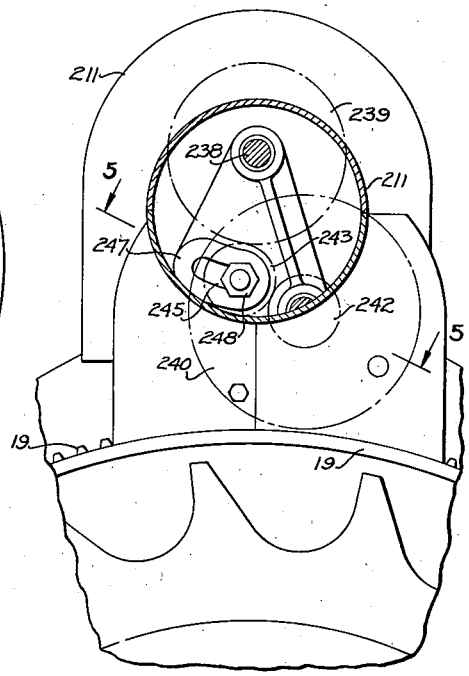
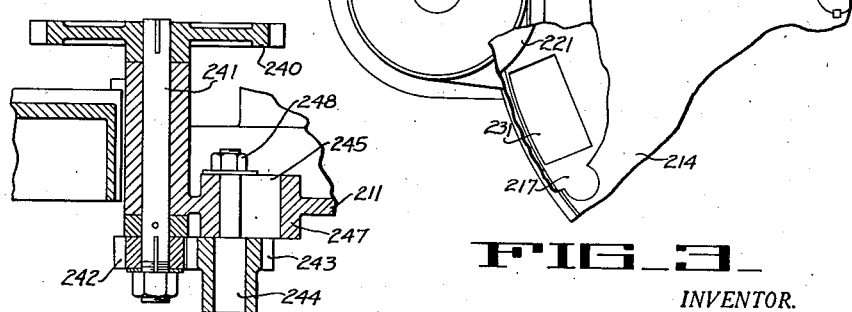
INVENTOR.
ALBERT R. THOMPSON
BY Philip A. Minnis
ATTORNEY Patented Aug. 4, 1942

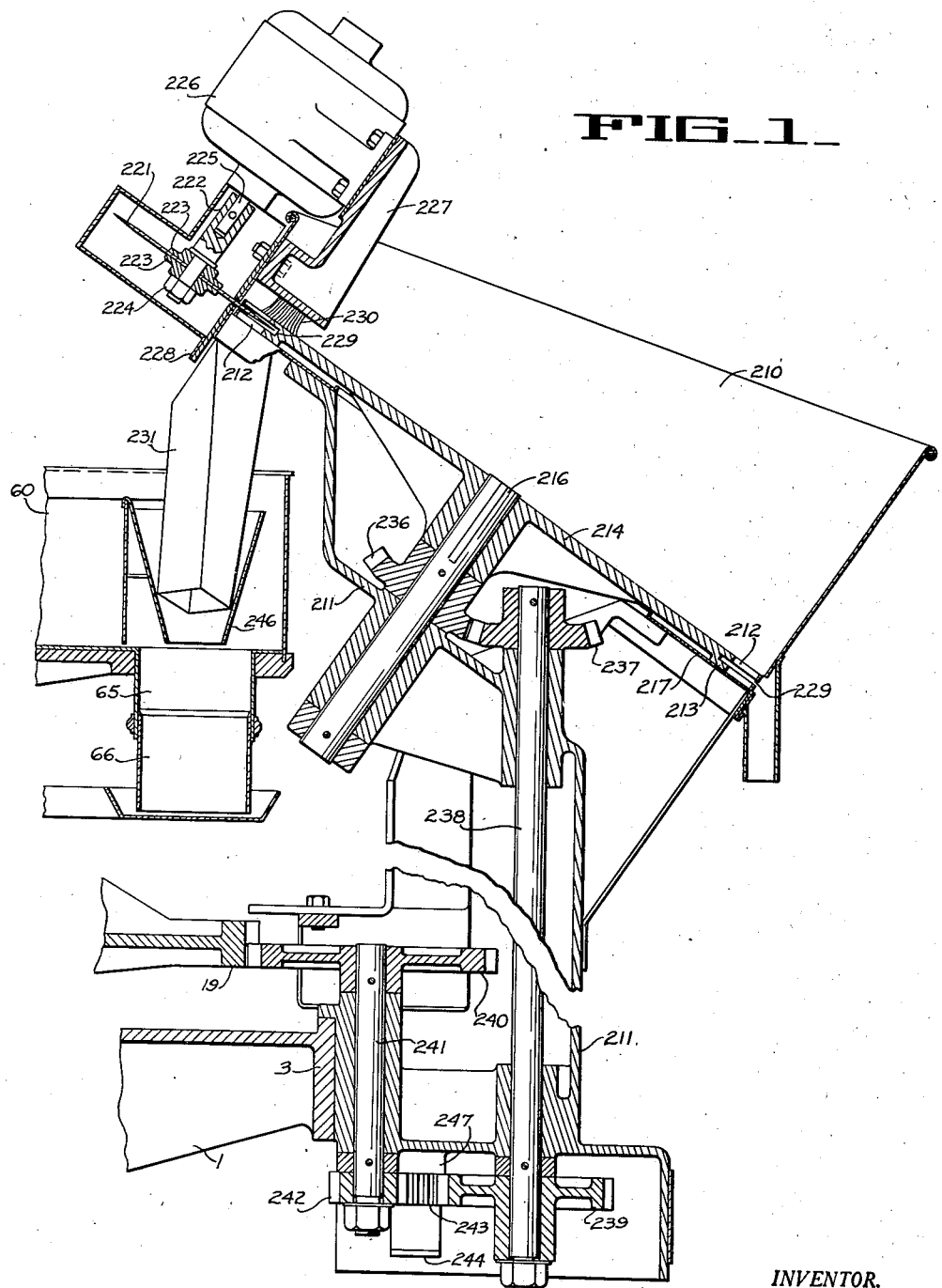

2,291,930

UNITED STATES PATENT OFFICE 2,291,930

STOCK FEEDER

Albert R. Thompson, Los Gatos, Calif., assignor to Food Machinery Corporation, San Jose, Calif., a corporation of Delaware Original application April 22, 1936, Serial No. 75,661, now Patent No. 2,196,403, dated April 9, 1940. Divided and this application August 21, 1939, Serial No. 291,243

3 Claims. (Cl. 146—73)

This invention relates to a stock feeder for filling machines of the character employed in dispensing a mixed charge of stock, such as fruits, vegetables, or the like, into containers, and is concerned more particularly with a stock feeder for preparing, measuring, and depositing a selected amount of an individual stock, such as cherries, for example. This application is a division of my co-pending application, Serial No. 75,661, filed April 22, 1936, for Filling machine, which became Patent No. 2,196,403 on April 9, 1940.

It is an object of the invention to provide an improved stock feeder for filling machines.

Another object of the invention is to provide a stock feeder which both counts and prepares individual units of the stock and feeds the desired number of units into each receptacle.

Another object of the invention is to provide an improved method of slicing stock, such as cherries.

Other objects will appear as the description progresses with reference to the accompanying drawings, where I have shown a preferred embodiment of the invention especially designed for preparing and feeding cherries.

In the drawings:

Fig. 1 is a vertical sectional view of the stock feeder and a portion of the filling machine associated therewith, the plane of the view being indicated by the line 1—1 in Fig. 2, certain parts being shown in elevation.

Fig. 2 is a plan view of the feeder and a portion of the filling machine.

Fig. 3 is a fragmentary plan view of the stock feeder with certain portions broken away to show details of the construction.

Fig. 4 is a sectional plan of the supporting and drive means of the feeder.

Fig. 5 is a fragmentary vertical section taken in the plane indicated by the line 5—5 in Fig. 4.

Generally, the filling machine with which the stock feeder of my invention is employed comprises a frame including base plate 1 on which drive gear 19 is mounted for rotation by suitable driving means, and a rotatable hopper 60 carried by the drive gear and having a series of measuring pockets 65, 66 for receiving the stock for subsequent dispensing into a container.

The stock feeder is constructed to prepare and measure a class of stock of the type such as pitted cherries and the like, which are preferably sliced into halves before being discharged into the receptacles, a definite number of the cherries or the like being counted for each receptacle. Generally, the feeder includes a hopper having an endless series of counting pockets with which a cutter is associated to cut the units of stock carried by the pockets before discharge thereof.

The stock feeder is mounted on the machine by the bracket 211 (Fig. 1) secured on a pad 3 of base plate 1, and includes a hopper 210 which is carried in inclined position by the bracket.

The series of counting pockets are provided by equally spaced apart apertures 212 (Figs. 1 and 2) in enlarged rim 213 of rotatable disc 214 which forms the bottom of the hopper 210 and is mounted on shaft 216 for rotation therewith. Disc 214 may be formed of brass or other suitable non-corrosive material. Apertured rim 213 has its bottom surface spaced in close cooperative relation with annular bottom wall 217 of the hopper, so that apertures 212 form an endless series of pockets, the size of which is preferably selected to hold one unit only of the stock being handled.

A cutter is associated with the series of pockets for halving the units of stock carried in the pockets before discharge thereof from the hopper. Disc cutter 221 (Fig. 1) is secured on the reduced end of sleeve 222 between collars 223 by means of nut 224. Sleeve 222 is pinned on drive shaft 225 of electric motor 226 mounted by bracket 227 on hopper 210. Cutter 221 extends through suitable slots formed in hopper 210 and plate 228 secured thereon and into annular slot 229 formed midway between the surfaces of rim 213 and extending inwardly beyond apertures 212. It is to be noted that cutter 221 extends entirely across an associated aperture 212 so that the unit of stock carried thereby will be halved completely.

Cutter 221 (Fig. 3) is positioned between brush 230 for removing excessive units of stock from any aperture and discharge spout 231 having a pressure fluid nozzle 232 (Fig. 2) aligned therewith. Pitted cherries supplied to hopper 210 will roll on the bottom plate 217 as they are elevated by movement of the disc 214, such rolling taking place about the stem-blossom axis with substantially all units of stock. Consequently, such units are presented to cutter 221 in a position to be halved through the stem-blossom axis.

The number of units of stock which are halved by cutter 221 and discharged through spout 231 into the charge receiving receptacles is counted by selective timing of the rotation of disc 214 and pockets 212 with respect to the movement of the receptacles, and for this purpose a plurality of selected speed drives for disc 214 for drive gear 19 is provided.

Shaft 216 (Fig. 1) carrying disc 214 is rotated through gears 236, 237 from shaft 238 having spur gear 239 at its lower end. Gear 239 is driven from drive gear 19 (Fig. 4) through gear 240, shaft 241, gear 242 carried thereby, and removably mounted gear 243 meshing with gears 242 and 239. Gear 243 (Fig. 5) is journalled on the lower end of shaft 244 above an end flange thereof, the reduced upper end of shaft 244 being adjustably positioned in slot 245 (Figs. 4 and 5) formed in boss 247 of bracket 211. Slot 245 is of less width than the lower end of shaft 244 so that nut 248 threaded on the upper end of shaft 244 serves to maintain the selected adjustment thereof. By selecting the pitch diameter of gear 242 and adjusting shaft 244 in slot 245 to obtain the proper engagement between the gears, the speed of disc 214 can be adjusted to deliver one or more halved units of stock, as desired, to each receptacle as it passes under spout 231 and funnel 246 (Fig. 1) associated therewith.

From the above description it is seen that the described form of stock feeder serves to both prepare and count the units discharged into each receptacle. It is to be noted that the slicing of the units is performed in the preferable manner along the stem-blossom axis.

While I have shown and described a preferred embodiment of the invention, the invention can be utilized in other forms, and its scope, therefore, should be limited only by the scope of the claims appended hereto.

I claim:

1. A stock feeder for preparing and feeding cherries or the like including a hopper, a member movable in said hopper, means for mounting said hopper and member in inclined position to cause a mass of cherries deposited in the hopper to remain at the lower portion thereof, said movable member having a pocket extending parallel to the axis thereof to receive and isolate a single cherry from said mass and to advance said single cherry toward the upper portion of the hopper, stationary means cooperating with the movable member for positioning the cherry in the pocket with its stem-blossom axis parallel to the plane of said member, and a rotary cutter associated with said member extending diametrically through the pocket to cut the cherry carried by said pocket in a plane containing the stem-blossom axis.

2. A stock feeder for preparing and feeding cherries or the like comprising a hopper, a rotatable disc closing the bottom of said hopper, means for mounting said hopper and disc in inclined position to cause a mass of cherries deposited in the hopper to remain at the lower portion thereof, said rotatable disc having a series of openings extending therethrough in a direction parallel to the axis of said disc, each opening being of a size to receive and isolate a single cherry from said mass and to advance said single cherry toward the upper portion of the hopper, said disc also having an annular slot extending from its outer periphery diametrically through said openings, a stationary closure member arranged beneath the openings in said disc and cooperating therewith to form pockets in which the cherries are advanced over said member to position them with their stem-blossom axes crosswise of the openings, and a rotary cutter extending into said slot to halve the cherries carried by said pockets.

3. A stock feeder for preparing and feeding cherries or the like comprising a hopper, an inclined rotatable disc closing the bottom of said hopper for supporting a mass of cherries at the lower portion thereof and having a series of openings extending therethrough in a direction parallel to the axis of said disc, each opening being of a size to receive and isolate a single cherry from the mass of cherries supported upon the lower portion of the rotatable disc, a closure member positioned in close cooperative relation with and parallel to said disc adjacent said openings to close the bottoms thereof and to arrange the cherries received within the openings with their stem-blossom axes parallel to the plane of said disc upon rotation thereof, an annular slot extending from the outer periphery of said disc diametrically through said openings, and a cutter extending into said slot to halve the cherries on their stem-blossom axes.

ALBERT R. THOMPSON.